April 1, 1958 H. T. KUCERA 2,828,920
PLURAL SITUS TEMPERATURE RESPONSIVE CONTROLLER
Filed June 3, 1954 3 Sheets-Sheet 1

INVENTOR.
Henry T. Kucera
BY
Eugene M. Giles
Atty

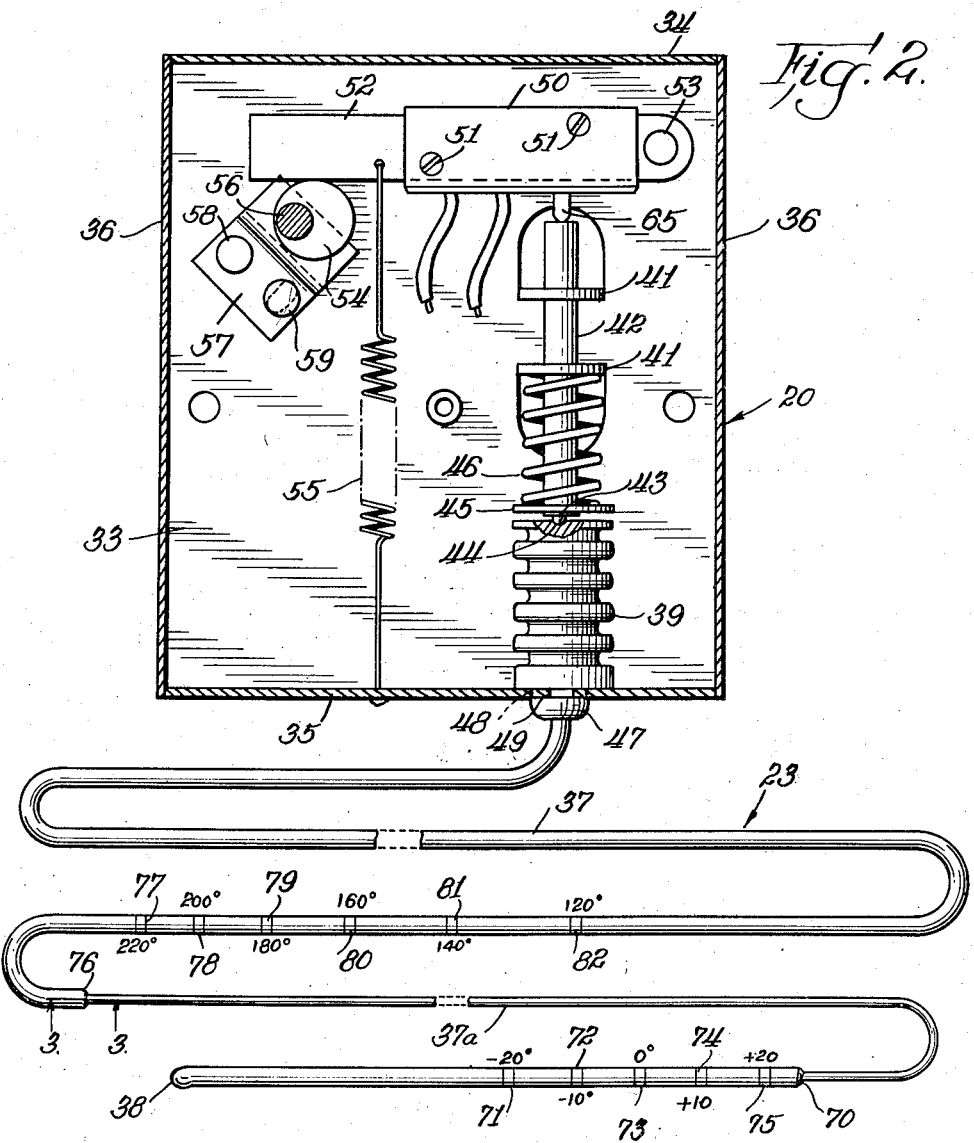

April 1, 1958 H. T. KUCERA 2,828,920
PLURAL SITUS TEMPERATURE RESPONSIVE CONTROLLER
Filed June 3, 1954 3 Sheets-Sheet 3
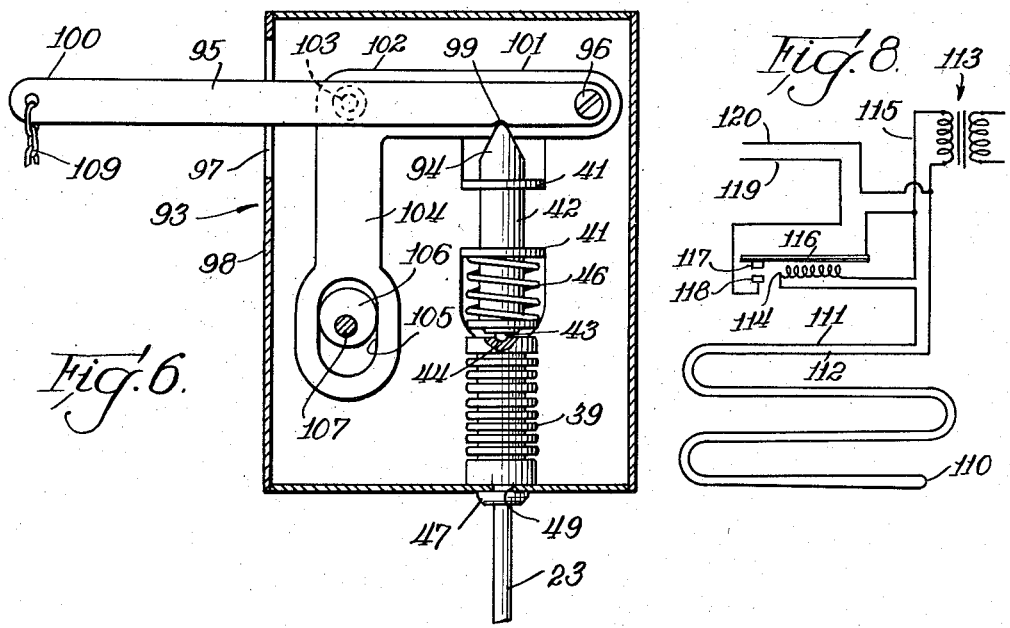
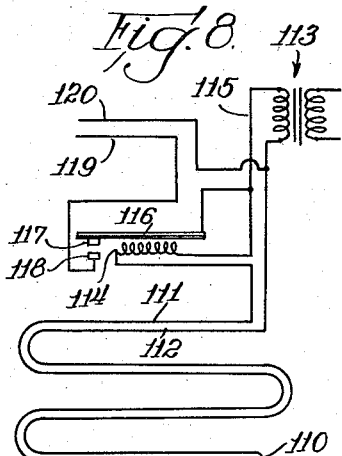
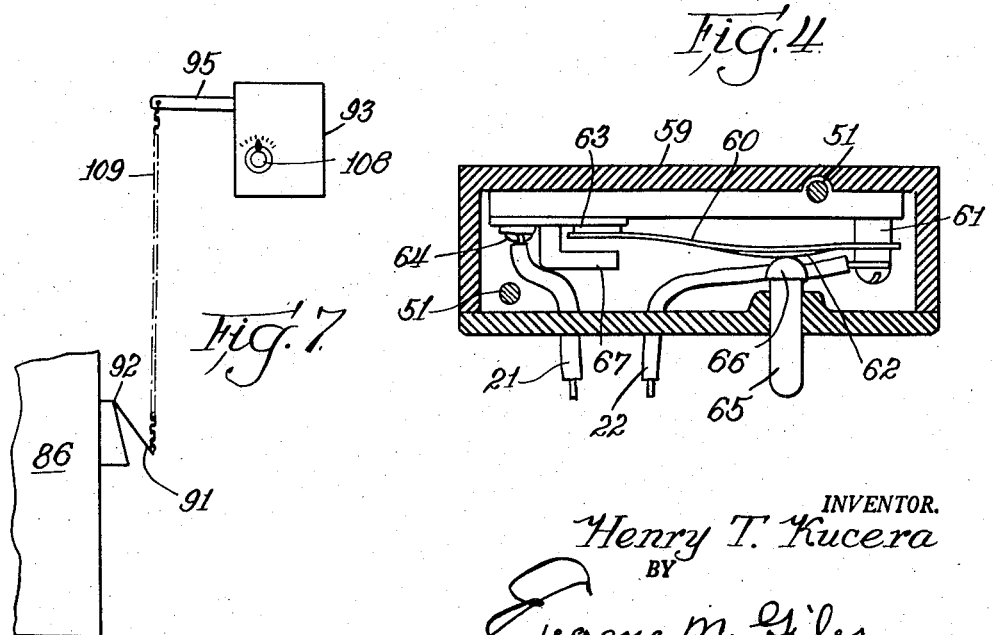
INVENTOR.
Henry T. Kucera
BY
Eugene M. Giles Atty.

United States Patent Office 2,828,920
Patented Apr. 1, 1958

2,828,920

PLURAL SITUS TEMPERATURE RESPONSIVE CONTROLLER

Henry T. Kucera, La Grange, Ill.

Application June 3, 1954, Serial No. 434,173

3 Claims. (Cl. 236—9)

This invention relates to temperature responsive controls for heating equipment, refrigerating equipment, air conditioning equipment and the like, in which the control is operable in response to the combined effect of temperature at a number of different places and has reference more particularly to a control and a method of control wherein a long temperature responsive element extends to each such place and has the temperature effect impressed thereon and coordinated therein at each place with the other temperature effects to produce a composite resultant effect by which the control is operable.

The invention includes provision for and method of quantitatively varying the local effect of the temperature at the different places in accordance with the requirements of the particular installation and varying the effect at one of the different places relatively or proportionately to that at another place or the other places to insure the proper ratio of effect thereof in the combined or total effect on the control, and it is also contemplated that the operation of the control by the said combined or total effect may be regulated to occur at various selectable totals of the combined local effects and adjustability thereby provided for selectability of the particular combined temperature level at which operation of the control occurs.

In heating houses or other buildings, for example, proper operation of the heating facilities for maintenance of desired uniformity of temperature in the heated area depends upon the relationship of the outside temperature to that of the heated area, and generally it depends also upon other temperature factors, such as the temperature of the heating medium that is being supplied at the time to the heated area and heat additions to the heated area from sources other than the heating medium. In other words, control of the operation of the heating facilities by a thermostat which is responsive only to the temperature of the heated area does not insure appropriate and comfortable heating if there is variable heat loss due to substantial variations of outside temperature or substantial variation in the temperature at which the heat is supplied or if the thermostat does not reflect the average temperature of the heated area and have such sensitivity that it exercises control upon slight variations of temperature in the heated area.

Likewise in air conditioning and refrigerating the temperature of the air conditioned or refrigerated area cannot be relied upon alone to maintain desired uniformity. In such cases it is desirable to modify the operation of the control thermostat at the heated or cooled area according to the temperature at the outside and the temperature of the supplied heat or refrigerant, and also according to any heat added from other sources or extracted therefrom, these cases being illustrative of purposes for which this invention is intended, although it is to be understood that the invention is not limited thereto but is applicable in any other case where it is desired to operate a control in accordance with the combined effect of temperature variables at a number of different places.

Such modification is effected by providing temperature responsive facilities at the places which thus affect the heating or refrigerating of the area which is regulated by the control and coordinating the effect of such temperature responsive facilities with the temperature responsive facilities at such area so that the control by which the heating or refrigerating is regulated responds to the combined coordinated effect of all.

All of these temperature responsive facilities which cooperate in the ultimate operation of the control not only must be properly coordinated or each contribute in the proper ratio with the others to the ultimate operation of the control, but each must faithfully contribute its proportionate ratio and without complicated coordination which might interfere with the accuracy or reliability of the composite control operating effect.

Individual or independent temperature responsive facilities at the several locations which are mechanically coordinated necessarily are complicated, expensive and involve possible factors of unreliability due to opportunity of faults in the construction thereof and in the adjustments thereof, and, moreover, provision for appropriately rationing the contributing effect of one such contributor to that of another or the others has heretofore occasioned complication and expense.

The principal objects of this invention are, to provide simple, convenient and reliable coordinated plural station thermostatic controls; to coordinate the effect of temperature changes at the various temperature responsive places through the thermostatically responsive medium itself without the intervention of any mechanical expedients; to provide simple facilities for localization of responsiveness to temperature changes at the particular places desired; to permit the extent or quantity of response required at each such location to be readily obtained and in selected ratio to that of the other locations; to provide convenient means for varying and selecting the particular level of resultant temperature at which the various contributed temperature effects conjointly cause the operation of the control to occur, and to provide an improved method of coordinating, rationing and communicating the temperature effects at several different places conjointly and in proper proportion to the control that is to be effectuated thereby, these and other objects being accomplished as pointed out more particularly hereinafter and as shown in the accompanying drawings, in which:

Fig. 2 is a view, partly in section and with parts broken away, of control facilities employed in the installation of Fig. 1;

Fig. 3 is an enlarged sectional view of a fragmentary portion of the tube of the thermo-responsive element of the control of Fig. 2, taken on the line 3—3 thereof;

Fig. 4 is a sectional view of the electric switch of the control of Fig. 2;

Fig. 6 is a sectional view of the modified form of control of Fig. 5;

Fig. 7 is a detail view of the connection of the control of Fig. 6 to the hot air heater of Fig. 5; and Fig. 8 is a view, somewhat diagrammatic, of a modified form of control.

Figure 1:
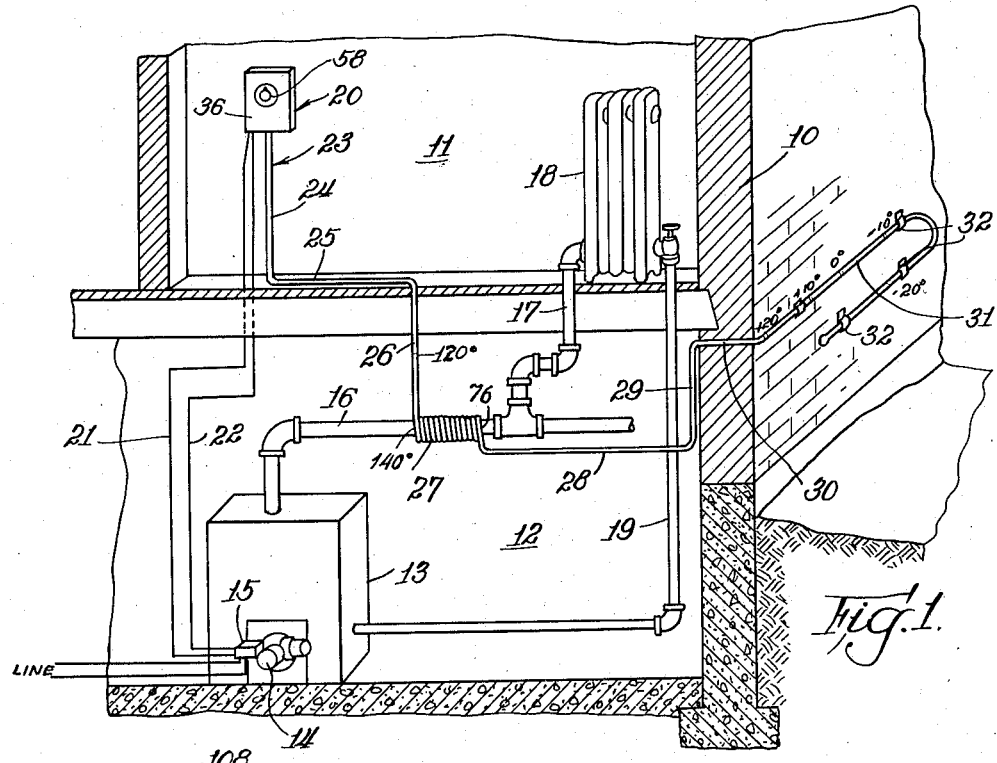
Fig. 1 is a view showing part of a building having a hot water type of heating installation provided with control facilities in accordance with this invention.

Referring first to Fig. 1 of the drawing, there is shown therein a portion of a building having an outside wall 10 and in the interior of said building is a room 11 which is to be heated, and a basement 12 in which a hot water heater 13 is located for heating the room. Obviously the heater may be of other types, such as steam or hot air, and for purposes of illustration is shown as fired by an oil burner 14 having a conventional control box 15 containing the usual electrically operated instrumentalities by which the burner is turned on and off by remote control. The heater may, however, be gas fired or coal burning type, the particular type of heater or fuel being immaterial so far as this invention is concerned.

A hot water main 16 leads from the heater 13 and supplies hot water therefrom through the pipe 17 to a heat exchanger or radiator 18 in the room 11 which is to be heated and a return pipe 19 leads from the radiator 18 back to the heater 13.

A temperature control apparatus 20 is located on the wall of the room 11 and has a pair of conductors 21 and 22 leading therefrom to the control box 15 at the burner 14 and through which said conductors current is supplied and discontinued at times determined by the operation of the apparatus 20 to actuate the controls in the control box 15 to start and stop the burner 14 in a manner well known in the art.

The control apparatus 20 has a long thermo-responsive element indicated as a whole at 23 leading therefrom by which the operation of the apparatus 20 is controlled, and this element 23 leads downwardly at some length in the room 11, as indicated at 24 and 25, and therefrom into the basement 12 where the heater is located and to the hot water main 16, as indicated at 26, around which it is closely wound, as indicated at 27, and it is continued from the winding 27 thereof over to the outside wall 10, as indicated at 28 and 29, and then out through the outer wall 10, as indicated at 30, and the end portion 31 of the element 23 at the outside of the building is formed in a hair pin bend and fastened, as at 32, to the outer side of the wall 10.

The entire length of the thermo-responsive element 23 is sensitive to the temperature to which it is subjected and to variations of temperature throughout its length and the outer end portion 31 thereof is subjected to temperature conditions outside the building and the coiled portion 27 is subjected to the temperature of the hot water in the main 16 and the portions 26, 28 and 29 are exposed to the temperature of the basement 12 and the portions 24 and 25 are exposed to the temperature of the heated room 11.

The control apparatus 20 and the thermo-responsive element 23 are shown in detail in Fig. 2 and parts thereof in Figs. 3 and 4. As shown in Fig. 2, the control apparatus 20 is enclosed in a case comprising a back wall 33 and top and bottom walls 34 and 35, the latter of which is rigidly secured to or a rigid part of the back wall 33 and the former of which is also preferably a part of the back wall 33, and the case also comprises a cover 36 (see Fig. 1) which closes the case at the front and opposite sides, the cover being removable for access to the contents of the case.

The thermo-responsive element 23 comprises a long tube 37 of suitable material which is closed at one end, as at 38, and at its other end is permanently secured in a hermetically sealed manner to the lower end of a hollow upright pressure responsive expansion member 39 in the case 33, 34, 35, 36 so that the interior of the tube 37 is in communication with the interior of the expansion member.

This expansion member 39 is of conventional elongated bellows form, closed at both ends and having a surrounding side wall with deep annular corrugations or folds so that it expands and contracts lengthwise as the volume of the contents increases and decreases. The tube 37 of the thermo-responsive element 23 and the expansion member 39 are completely filled with a liquid which expands and contracts in volume in accordance with increase or decrease of temperature to which it is subjected, and the tube of the thermo-responsive element 23 is non-expansible or relatively non-expansible so that the expansion and contraction of the liquid throughout the length of the thermo-responsive element results in corresponding increase and decrease in the volume of liquid in the expansion member 39 which is thereby increased and decreased in length. Obviously an expansible liquid is employed which will remain in liquid condition throughout the range of temperature to which it is subjected.

It is important that the tube of the expansion element is readily bendable and without collapse and a relatively thick walled small diameter tube is employed, preferably of soft copper which bends readily and is not detrimentally affected by exposure to weather conditions, a soft copper tubing of ⅛ inch outside diameter having an inside diameter of approximately 1/16 of an inch being satisfactory.

This tube 37 may be of the same diameter throughout its length but it is preferred to reduce the size thereof throughout the portion of the length thereof, as indicated at 37ª in Fig. 2, from the portion 27 thereof which is wrapped around the pipe 16 to the portion 31 thereof outside the building. This may be accomplished by swaging the 37ª portion of the tube to smaller size or, as shown in Fig. 2, it may be accomplished by substituting a smaller tube for the selected portion 10ª of the length of the tube, for example, a tube 37ª of 1/16 inch outside diameter, the opposite ends of which are telescoped into the respective separated ends of the larger tube 37 and brazed or soldered thereto, as indicated at 40 in Fig. 3. The opening in the small tube is preferably very small and merely sufficient to provide communication of liquid therethrough from the one section of the larger tube 37 to the other section thereof, so that the temperature response of this portion of the thermo-responsive element 23 is negligible.

The bendability of the tube 37 is of special importance not only to permit the thermo-responsive element 23 to be shaped as required to lead from place to place in the installation thereof, as shown in Fig. 1, but also to permit wrapping of the element 23 around pipes, as indicated at 27 in Fig. 1, or otherwise concentrating selected portions of the length thereof in a particular location where it may be necessary or desirable to provide proper exposure thereof to the temperature at that location. It is also advantageous as the element 23 may be coiled into a small compact form for handling and transportation of the control.

The expansion member 39 is held firmly in upright position on the bottom wall 35 of the control apparatus case and directly above the expansion member, guides 41 are provided which have aligned openings in which a plunger 42 is slidably mounted in axial alignment with the expansion member 39, and the lower end of this plunger 42 has a rounded bearing end 43 which engages in a correspondingly rounded central recess 44 in the top wall of the expansion member, as shown in Fig. 2. The ears 41 may be conveniently provided by punching from the back wall 12 of the regulator case.

Above the rounded bearing end 43 the plunger 42 has an annular flange 45 fixed thereto and a coil spring 46 is compressed between this flange 45 and the lower plunger guide 41 to hold the bearing end 43 of the plunger firmly in the expansion member seat 44 and provide a yielding resistance to expansion of the expansion member 39.

This spring tension of the plunger is also employed for holding the expansion member 39 in position, the latter having a flat lower end with a central boss 47 which fits in an appropriate opening 48 in the bottom wall 35 so that the tension of the spring 46 holds the expansion member upright and locked in place by the engagement of the boss 47 with the opening 48. A slot 49 extends outwardly from the opening 48 to the front edge of the wall 35 and is of a width to accommodate the diameter of the tube 37 and thus the expansion member may be inserted and removed from the case 33, 34, 35, 36 with the tube 37 attached thereto.

The plunger 42 operates a switch 50 which is preferably adjustable to change the position thereof with respect to the plunger 42 and thereby select the particular point in the range of expansion and contraction of the expansion member 39 at which the switch operations are caused to occur, and for this purpose the switch 50 is secured by screws 51 to a rock arm 52 which is mounted at one end on a trunnion or pivot 53 which is secured to the case back wall 33, and this rock arm has the opposite end extending over a rotatable cam 54 which the arm 26 may be pivotally raised and lowered and with it the switch 50 thereon. The arm 52 is connected near its free end by a spring 55 with the bottom wall portion 35 of the case to hold the arm 52 in constant firm engagement with the peripheral face of the cam 54 except at such time as the arm 52 is lifted therefrom by the plunger 42.

The cam 54 is an eccentric on a shaft or stem 56 which is mounted to rotate in a bearing bracket 57, the latter of which is fastened at 58 and 59 to the rear wall 33 of the case and the stem 56 projects through the cover 36 of the case and is provided on the outer end with a knob 58 (see Fig. 5) by which the cam 54 is adjustable.

The knob 58 is provided in the usual manner with a pointer thereon (not shown) which in the rotation of the knob moves along graduations (not shown) on the cover 36 in the usual manner for adjusting the cam 54 predetermined amounts represented by the graduations.

The switch 50, which is shown in detail in Fig. 4, is similar to that disclosed in my Patent No. 2,333,319 dated November 2, 1943, and comprises a case 59 of insulating material having a spring arm 60 fixed at one end to a terminal post 61 and slightly warped to provide a slight bulge at one side, as indicated at 62, so that the switch arm is normally biased thereby with the outer end of the switch arm bearing against a contact plate 63 which has a terminal screw 64, and as the spring arm 60 is a conductor thereby establishes an electrical connection between the terminal post 61 and the contact plate 63 and its terminal screw 64.

A headed switch operating pin 65 is slidable in an opening in a boss in the bottom of the switch case 59 at a place where it is directly above and engageable by the expansion member operated plunger 42 and this switch pin 65 has the head 66 at the upper end located directly below the place of maximum bulge 62 so that when the pin 65 is lifted it bears against the bulge and as the bulge is close to the fixed and immovable end of the switch arm and the outer end of the switch arm 60 then bears against the contact plate 63 the upward movement of the pin 65 reverses the bulge 62 and thereby snaps the outer end of the switch arm 60 downwardly against a stop 67, which may be formed as a part of the case 60, in which position the switch arm is retained as long as the switch pin is in a sufficiently elevated position to retain the bulge 62 in the reversed position.

When the pressure of the pin 65 against the bulge 62 is relaxed, the bulge returns to normal and thereby snaps the switch arm 60 back to the Fig. 4 position thereof in engagement with the contact plate 63.

Thus as the liquid in the thermo-responsive element 23 expands it increases the volume of liquid in the interior of the expansion member 39 and the latter progressively expands vertically and progressively forces the plunger 42 upwardly, and the latter by engagement with the switch operating pin 65 gradually lifts the latter, and as the switch 50 is then held against movement by the spring 55, in the particular position determined by the position of the cam 54, at a certain point in the expansion of the expansion member 39, the switch pin 65 is lifted to the place where the switch arm snaps downwardly from the Fig. 4 position to the position of engagement with the abutment 67 in which position the switch arm remains until there is sufficient contraction of the liquid in the thermo-responsive element 23 to relax the pressure of the switch pin 65 against the switch arm, whereupon the switch arm 60 snaps back to the normal position thereof shown in Fig. 4.

Continued upward movement of the plunger 42 is permitted after the switch arm 60 is snapped to the position of engagement with the contact 67, as the rock arm 52 is free to lift upwardly from the cam 54 against the tension of the spring 55 which is sufficient to prevent lifting of the rock arm 52 until after the switch operation occurs.

Inasmuch as the bulge 62 is close to the free end of the arm 60 no appreciable movement of the bulge area of the arm 60 occurs in this continued upward movement of the plunger 42 and accordingly no swinging movement of the arm 60 occurs away from the abutment 67.

Conductors 21 and 22 extend respectively from the terminal screw 64 and terminal post 61 to the burner control box 15, which is of conventional type for operating the valves, ignition and motor, with which such burners are usually provided, under remote thermostatic control, and which usually includes a transformer which supplies low voltage current from the thermostat circuit, and the arrangement thereof is such that when the circuit is closed through the switch 50, as shown in Fig. 4, operation of the burner 14 occurs and when the switch 50 is open and the switch arm 60 separated from the contact plate 63, the operation of the burner 14 is discontinued.

Thus in the switch position of Fig. 4, the burner 14 is in operation and the operation thereof is discontinued when the expansion of the pressure responsive member 39 reaches the exact point at which the switch arm 60 snaps to the position reversed to that shown in Fig. 4 and engages the abutment 67.

Adjustment of the cam 54 changes the elevation of the switch 50 and the relation of the switch pin 65 to the expansion member operated plunger 42 and thereby varies the point, in the increase and decrease of volume of liquid in the expansion member 39 at which the switch closing and opening operations occur, and it is important that the cam 54 be so arranged with respect to the rock arm 52 on which the switch is mounted that the switch operation occurs at a certain precise position of the cam 54 at a certain precise amount of the expansion of the expansion member 39, and that there is adjustability of the arm 52, and preferably equal, in opposite directions, from that certain precise position of the cam 54.

In heating rooms and buildings, 70° F. is usually considered a normal temperature therefor and the switch operation at the above mentioned certain precise point is arranged to occur when the thermo-responsive element 23 is subjected uniformly to a temperature of 70° and the control apparatus case 20 is provided with a graduation indicative of this 70° temperature with which the pointer on the dial 58 registers when the cam 54 is adjusted to the above mentioned certain precise position established by the 70° temperature as aforesaid, and the control apparatus case also preferably has graduations at opposite sides of the 70° graduation which correspond to the required positions of the cam for causing switch operation at progressively higher and lower thermo-responsive element 23 temperatures and with which the pointer on the dial 58 registers.

Thus, by appropriate operation of the dial 58 the temperature of the thermo-responsive element 23 at which the switch operation occurs may be regualted to occur at various levels above or below the 70° room temperature as required to maintain the room at the desired selected comfortable temperature.

Because of the difficulty in commercial production in maintaining close enough tolerances to insure such accuracy in all cases that the required relationship of the cam 54 and rock arm 52 will be obtained to insure switch operation at the certain precise point corresponding to the graduation marking on the case 20, in the manufacture of the apparatus 20, the cam supporting bracket 57 is made with the bracket fastened only at the place 58 and left free enough so that the bracket may be adjusted around the fastener 58 as a pivot, and then after the control has been completely assembled, the thermo-responsive element 23 is subjected to a temperature of 70°, which as above mentioned is regarded as normal room temperature, and while the cam 54 is held in the midway position of its rock arm 52 adjusting movement shown by the registering of the pointer of the dial 58 at the 70° marking on the case 20, the bracket 57 is swung on the fastener 58 as a pivot until the cam 54 is positioned at the exact point to locate the rock arm 52 at the place where opening and closing movement of the switch 50 occurs, and then the fastener 59 is applied or firmly fixed in position so that the bracket is permanently secured in the thus adjusted position.

With the above described installation of Fig. 1 the expansion and contraction of the pressure responsive member 39 depends upon the expansion and contraction of the liquid in the various portions of the length of the tubing 37 and also in the expansion member 39 as well, and this in turn depends upon the temperatures to which the liquid is subjected at the different places.

As temperatures external of the space to be heated drop, the liquid in the portion 31 of the tubing 37 contracts, and if the liquid volume remains the same in other parts of the tube 37, this contracting of the liquid in the portion 31 causes the pressure responsive member 39 to contract accordingly thereby lowering the plunger 42.

When the lowering action is sufficient to allow the rock arm 52 to come to rest on the cam 54, due to the weight of the arm 52 and tension of the spring 55 thereon, any further drop in temperature of the liquid at any place in the tubing 37 will cause the plunger 42 to move downwardly from the switch case thus permitting the switch pin 65 to move downwardly independently of the switch case 50 and any such slight downward movement of the switch pin permits the spring arm to snap from the Fig. 4 position and open the circuit through the switch and thereby cause the burner 14 to operate.

This operation of the burner will cause rise in the temperature of the water in the heater 13 and as the temperature thereof rises it will be communicated through the circulating pipes 16, 17 and 19 to the radiator or heat transfer device 18, causing heat transfer to the space 11.

The temperature of the thus heated water flowing to the radiator 18 will be communicated to the liquid in the portion 27 of the tubing that is wrapped around the main 16, thereby causing that part of the liquid to expand and thus extend the pressure responsive member 39, thereby lifting the plunger.

In the aforesaid contracting of the expansion member 39 and lowering of the plunger 42 thereby which occurred as a consequence of the drop in the external temperature to which the portion 31 of the tube is exposed, there may be and usually are two stages of movement thereof in one of which, namely, the first part of the downward movement of the plunger 42 in which the rock arm 52 and switch 53 are lowered to the point in which the arm 52 engages the cam 54, during which time the switch 50 is inoperative and the circuit therethrough remains open, and in the other or second part of which said downward movement the plunger releases its pressure on the switch pin 65 sufficiently so that the switch closing operation occurs and starts the operation of the burner 14, and the plunger, in this second part movement, may continue its downward movement beyond the point at which the said switch closing operation occurs.

Bearing this in mind and considering again the above referred to condition in which, after a drop in the outside temperature, the burner 14 has been set in operation thereby and the consequent rising temperature of the water in the pipe 16 is being communicated to the portion 27 of the tubing wrapped around the pipe, as soon as the expansion of the liquid in the portion 27 of the tube is the same in volume and balances the amount of contraction of the liquid in the outdoor tube portion 31 which occurred in the second above mentioned part of the downward movement of the plunger 42, said plunger will then have been returned to the position at which the previous above mentioned switch opening operation occurred (unless the cam 54 has been moved in the meantime) and immediately after it reaches that position, slight further upward movement of the plunger 42 by the continuance of the expanding of the liquid in the tube section 27 by rising temperature of the water in the pipe 16 will cause switch opening operation to occur and thus discontinue the operation of the burner 14.

Of course if the outside temperature continues to drop, the liquid in the outside tube portion will continue to contract after it has contracted sufficiently to start the burner 14 operating and the plunger 42 will drop down a proportionate distance below the switch pin 65, in which event the heating of the water as ascertained by the tube portion 27 may not be sufficient or sufficiently rapid to balance the expansion of liquid in the portion 27 against the contraction of the liquid in the portion 31 for some time, but when such balancing does occur and the amount of liquid expansion in the portion 27 does exceed the amount of contraction in the portion 31, then the opening of the switch 50 will occur.

Thus the lower the temperature external of the heated space drop, the higher must the temperature of the heating medium rise to cause expansion of liquid in the portion 27 of the tubing to equalize the contraction of the liquid in the outdoor portion 31 and cause movement of the plunger to stop the burner 14.

Moreover, the heating level or average heating level of the heating medium rises with drop in outside temperature and the rate of heat exchange from the radiator is thereby increased by such drop in outside temperature and thus the rate of the room heating increases and decreases in proportion to the outside temperature.

In the above discussion of the cooperative relationship of the portions 27 and 31 of the thermo-responsive element 23 the cooperative action of the portions 24, 25 thereof has been disregarded, although the temperature effects on said portion 24, 25 have a substantial modifying effect on the performance of the heating system in conjunction with the effects of the portions 27 and 31 thereon.

As temperatures in the heated space 11 rise, due to heat transfer from the radiator 18 or due to heat of cooking, solar heat, body heat, etc., the liquid in those portions 24, 25 of the tubing located in the heated space will expand and will affect the pressure responsive member 39 the same as though the expansion thereof occurred in the portion 27 of the tubing, thus stopping the operation of the heater 13 at a lower heating media or hot water temperature than would be necessary for any particular outdoor temperature were the temperature in the house to remain stationary.

As the action of the pressure responsive member 39 is dependent upon the average of the temperature of the total liquid content of the tubing and in addition thereto the liquid content of the pressure responsive member 39 itself, a change in the temperature of the heating medium or of the heated space or of the space external to the heated space may cause sufficient contraction or expansion of the switching to cause switch operations to occur.

The proportionate effect of the temperatures of the heating medium and temperatures internal and external of the heated space upon the action of the pressure responsive member 39 is varied by the volume of liquid content subjected to the temperatures at each of the places where it is subjected to these temperatures, and it is important that the liquid content be properly proportioned at the respective places not only in a general way, for example, in house heating, it is generally desirable that the liquid content of the portion in the heated area be substantially greater than that at either the heating medium or at the outside of the building, in any event, but it is important that the liquid content at these places be proportioned according to the circumstances of the particular installation and especially the liquid content at the heating medium and the liquid content outside the building to one another, the relative proportions of which depend upon the average low limits of temperature at the geographical location of the installation and the capacity of the particular heating plant or size of heat transfer equipment, or in other words, the capability of the particular heating equipment to furnish the required amount of heat to the heated area.

The proportionate effect of the temperatures of the heating medium and of the temperatures external and internal of the heated space upon the action of the pressure responsive member 39 which as aforesaid depends upon the amount of liquid content of the thermo-responsive element 23 at each of the areas or places, may be readily accomplished in accordance with the present invention by proper proportioning of the length of the tubing located in each such area or place.

As an example of such proportioning, in a heating system where house temperatures are to be maintained at a constant 70 degrees F. and where the size of the heat transfer devices are so proportioned that a heating media temperature of 150 degrees F. is required at an extreme outdoor temperature of 10 below zero, the portion of the length of tubing 37 to be located outdoors as at 31 in Fig. 1, would be identical to the portion of the length thereof subjected to the temperature of the heating media, as at 27 in Fig. 1, as the range of outdoor temperature, namely, 70° to minus 10°, or 80° difference, is identical to the range of temperatures required in the heat transfer devices, namely, 70° to 150°, or 80° temperature difference.

Thus for each one degree that outdoor temperature dropped below 70° F., the heating media temperature must rise one degree to hold the system in balance and stop heater action.

In this example it is considered that the only heat introduced into the house is by the heat transfer devices, in which case it makes no difference how much or for that matter if any of the thermo-responsive element 23 is placed inside the heated space 11.

With the temperatures in the heated space remaining at a constant 70° F., and with no change between maximum heating media temperature and room temperature, as the difference between indoor and external outdoor temperature (normally called design temperature of the heating system) increases, the length of tubing 37 required to be subject to such outdoor temperatures decreases proportionately inasmuch as the total expansion or contraction of the liquid in the tubing portion 31 per degree change in outdoor temperature must be proportionately less the greater the difference between indoor and extreme outdoor temperature.

For example, in an area where the coldest outdoor temperatures experienced or designed for are twenty degrees F. below zero, then the difference between the room temperature (70° F.) and the heating media temperature (150° F.) being the same as in the previous example, namely 80° F., but the difference between the room temperature (70° F.) and the maximum outside cold temperature (−20° F.) having increased 10° F. to 90° F., then a lesser length of tubing 37 would be exposed at the outside of the building in the proportion of the said 80° and 90° difference and the outside portion 31 would then be eight-ninths as long as the portion 27 of the tubing 37 subjected to the heating media temperature.

As there are many sources of heat input to a building other than that through the controllable heat transfer devices, it is necessary to measure and compensate for such extra heat input if temperatures in the house are to be maintained at a controlled level.

This is accomplished by the section 24, 25 of the thermo-responsive element which is located in the heated area so as to measure the average temperature indoors. Any rise in the indoor temperature causes an expansion of the liquid in the section 24, 25, lowering the liquid temperature required in the section 27 to maintain a balance in the tube 37 at any outdoor temperature. The greater is the liquid content in the indoor section 24, 25 as compared to the liquid content of the outdoor section 11, the more sensitive and more rapid will be the leveling off of the temperatures in the house. In practice, to accentuate this greater sensitivity, approximately four or five times as much length of thermo-responsive element 23 is placed indoors as is placed outdoors.

In an example, if a control containing a thermo-responsive element 23 equal to 6 units of length were installed completely in the heated space with the tubing stretched out, the unit would act as a stretched out thermostat, actuating the switch 50 of the control apparatus as average temperatures in the heated space change.

Should one unit of the length of the element 23 be placed outdoors, with five units of the length remaining in the heated space, for each five degrees of outdoor temperature drop, the indoor temperature must raise one degree to maintain the thermostatic element 23 in balance or, in other words, to maintain the same volume in the control expansion member 39.

Should the outdoor section 31 be one unit in length, the section 27 measuring the heating medium temperature be one unit long and the section 24, 25 measuring temperatures of the heated space 11 be four units long, for each degree the outdoor temperature gets colder, the heating medium temperature must necessarily rise one degree to keep the thermostatic element 23 in balance.

Should the outdoor section 31 be two units in length, the section 27 be one unit in length and the section 24, 25 be three units in length, then for each three degrees of drop in the outdoor temperature, the temperature of the heating medium must rise approximately three degrees and the temperature of the heated space must rise approximately one degree to maintain the thermo-responsive element 23 in balance.

As the rate of heat rise of the heating medium may be more rapid than the rate of heat rise of the heated space, it might take two or three operations of the burner 14 before the temperatures leveled off as indicated. However, they would approach this balance.

By varying the length of tubing 37 to be located outdoors (at 31) relative to the length thereof required (at 27) to raise the heating medium temperature just sufficient to maintain a constant indoor temperature, it is possible to vary the rate of temperature rise in the heated space per degree of drop in temperatures external of the space heated.

While the control may be furnished with a thermo-responsive element 23 of any required or desired length, it is generally furnished in a standardized length suitable for general use, a length of approximately 46 feet having been found to be sufficient.

Also to simplify the proportioning at the required amounts of the tubing 37 to be located respectively in the heated space, at the heating medium and at the outside of the building, indexing tabs or markers are provided on the element at appropriate places at measured distances apart, and calculated as above indicated on the basis of the factors involved in providing uniform and comfortable heating, so that the portions of the length to be exposed to the particular temperatures to be measured and the appropriate amounts thereof to be exposed thereto is shown on the element 23.

The end portion of the tubing remote from the control apparatus 20 is utilized for measuring the outdoor temperature and an intermediate portion of the tubing is utilized for measuring the heating medium temperature and between these portions is interposed the small tube portion 37a which is approximately 15 feet in length. This tubing 37a is so small that it contains almost no liquid in its entire 15 foot length, thereby eliminating any appreciable responsiveness of this section to temperature changes, which makes it practical to run this section in an unheated basement or along a water main or the outside wall or a warm air duct of the heating system without having any temperature variation in this unheated space affect the operation of the control apparatus 20.

The end portion of the tube 37 beyond the juncture 70 thereof with the small tube 37a is 6 feet 9 inches long and at measured intervals from the end 38 thereof that portion of the tube is provided with permanently attached tabs or markers indicated at 71, 72, 73, 74 and 75 which are marked respectively −20°, −10°, 0°, +10° and +20°, the latter being approximately at the joint 70, and each of which tabs indicates the length of element 23 from the end 38 that is to be located outside the building in the area in which the design temperature (coldest normal winter temperature) thereof corresponds to the temperature shown on that tab or marker.

For example, in an area where the design temperature is −20° F., only the portion of the element from the end 38 to the marker 71 would be exposed to the outside temperature, and in an area of +20° F. design temperature the length from the end 38 to the marker 75 would be exposed.

The illustrated system of Fig. 1 is arranged for a design temperature of +20° F. and accordingly the entire portion from the end 38 to the tab 75 is located at the outside of the wall 10 and a portion of the small tube 37a extends through the wall as indicated at 30. If a shorter length were employed for the outdoor section 31, than the end length from the end 38 to the joint 70, then a portion of the tubing 37 beyond the joint 70 would extend into or through the wall 10.

For example, if the installation was for a design temperature of −20° F., then the portion extending beyond the marker 71 toward the joint 70 and having the markers 72, 73, 74 and 75 thereon would extend into and through the wall 10.

The portion of the element 23 to be located at the place of exposure to the heating medium, as for example at 27 in Fig. 1, begins at the juncture 76 of the small tube 37a with the large tube 37 and extends toward the control apparatus 20 and at measured intervals from said juncture 76, the tube 37 is provided with permanently attached tabs or markers indicated at 77, 78, 79, 80, 81 and 82 which are marked respectively 220°, 200°, 180°, 160°, 140° and 120° and each of which indicates the length of element 23 from the juncture 76 that is to be located at and exposed to the heating medium temperature under circumstances depending on the particular temperature length installed at the outside of the building as at 31.

The particular temperature of tab 77, 78, 79, 80, 81 or 82 selection to be made depends upon the temperature of the heating media of the particular heating system that is required to heat the space to be heated at the design temperature (coldest normal winter temperature) of the location where the installation is made, and which is readily calculated by those familiar with heating, and the tab corresponding or nearest to that required temperature of heating media is selected to determine the length of the tubing 37 exposed to the heating media of the system.

For example if the temperature of the heating media required from the particular heater to heat the heated space at −10° F. was 180°, then the portion of tubing from the juncture 76 to the marker 79 would be placed or arranged to be subjected to the heating media—for example, wrapped around the pipe 27 of Fig. 1.

In the illustrated system of Fig. 1, in which the design temperature is shown as of +20° F., and the temperature of the heating media from the heater 14 required to heat the heated area at that +20° F. temperature was 140° F., then the portion from the joint 76 to the tab 81 would be wrapped around the pipe 17.

The length of the tubing 37 from the joint 76 to the control apparatus 20 is 24 feet 3 inches and provides ample length to wrap around the pipe 27 and extend upwardly therefrom to the room 11 and leave a substantial length thereof to be installed in the room and provide a stretched out thermostat 24, 25 in the heated space which insures sufficient length of thermo-responsive element 23 in the room 11 so that its responsiveness reliably represents average temperatures of the heated space and its sensitivity and proportionate effect on the control apparatus 20 is such that close limits of variation of temperature in the heated space are assured.

The element 23 is preferably extended as directly as possible to the upstairs room area so as to minimize the length 26 thereof in the basement and to arrange as much of the thermo-responsive element length in the upstairs room 11 where it will react to the room temperature.

The heating medium temperature is preferably obtained from the main, as shown in Fig. 1, through which the hot water flows to the various heat exchangers 18 in the building, rather than at the boiler, as boiler temperatures are not reliable to indicate the heating medium temperature for present purposes, as in some cases a substantially uniform boiler temperature is maintained and the heat supply to the heat exchangers regulated by controlled flow of the heating medium therefrom to the heat exchanger supply mains and in any event, the boiler temperature is likely to be higher than and not accurately representative of the temperature of the heating medium being supplied to the heat exchangers.

When the thermo-responsive element is wound around the pipe, as shown herein, it should be applied in close heat conducting relation to the pipe and, after winding thereon, covered with an insulation to retain the communicated heat in the zone of the winding.

The control apparatus 20 may be connected directly to the control box 15 as shown in Fig. 1, or if there is an already existing thermostat in the heated space or one is preferred in addition, or if a clock thermostat is desired this control may be connected in series therewith, the leads 21 and 22 from the apparatus 20 being connected in the current supply line to the other thermostat and not to the control conductor or any of the control conductors therefrom.

In such event the said other thermostat should be set at an elevated temperature well above the normal room temperature if control is to be exercised solely by the control apparatus 20, but in the case of the clock thermostat the clock setting would remain at the desired night temperature so that it would exercise its intended night control.

In a hot air heating system, the section of the thermo-responsive element 23 to evaluate the temperature of the heating medium is placed in the main hot air supply duct from the heater.

Figure 5:
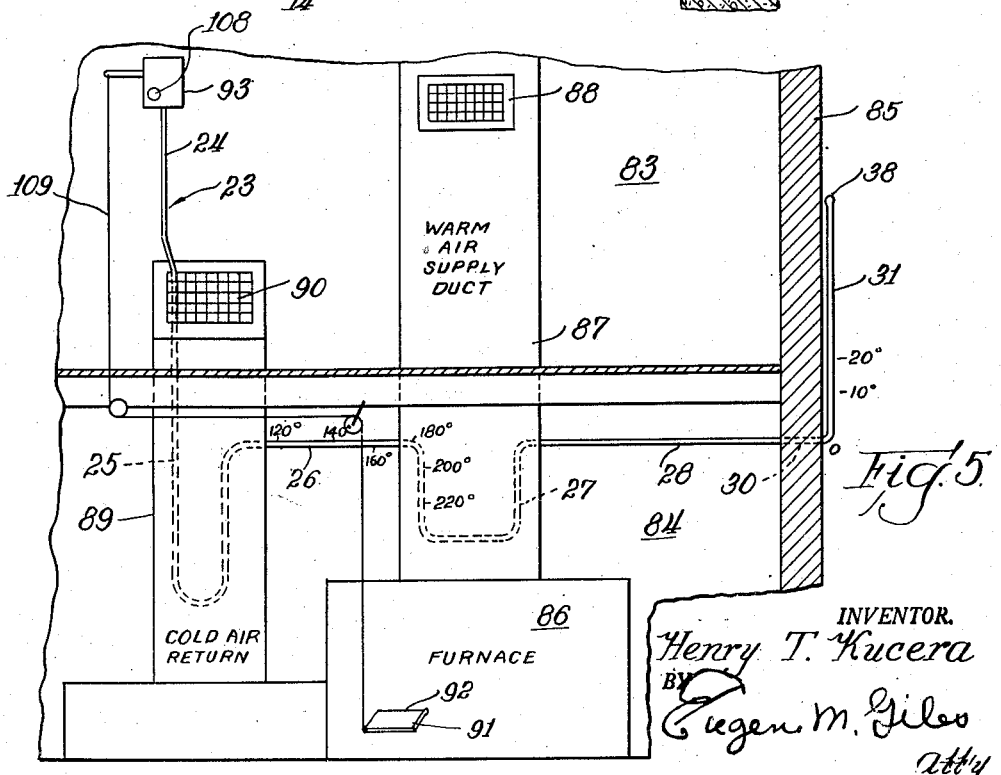
Fig. 5 is a view showing part of a building having a hot air type of heating installation provided with a modified form of control.

Such hot air heating system is shown in Fig. 5 wherein 83 indicates the heated space, 84 the basement, 85 the outside wall, 86 the hot air furnace, 87 the main hot air duct which supplies hot air to the space 83 through a register or grille 88 and 89 the return duct through which air from the space 83 entering through the register or grille 90 is returned to the furnace 86 for recirculation therethrough in the conventional manner of hot air heating.

Blowers or fans may be employed for force air circulation and controls may be exercised on these, as well as on the source of heat supply such as oil, gas or coal or other fuel, but for illustrative purposes the furnace 86 is merely shown with a damper 91 which is pivoted at 92 and arranged to be opened and closed to regulate the heat supply. It corresponds to the control box 15 facilities of Fig. 1 and opening of the damper 91 is assumed to start or increase the heating of the furnace and closing the damper is assumed to stop or diminish the heating of the furnace.

In Fig. 5, 93 indicates the control apparatus which is substantially the same as the control apparatus of Fig. 1, except as hereinafter particularly mentioned, and 23 indicates the thermo-responsive element (the same as in Figs. 1 and 2) and the same reference numerals are used in Fig. 5 as in Figs. 1 and 2 to indicate the corresponding portions thereof (except that in Fig. 5 the reference numeral 28 is applied to indicate the part which is indicated at 28, 29 in Fig. 1), as the thermo-responsive element of Fig. 5 is exactly the same as that employed in Fig. 1 and shown in Fig. 2.

In this hot air system of Fig. 5, the heating medium temperature reflecting portion 27 of the thermo-responsive element is looped in the hot air duct 87, and the room temperature reflecting portion 24, 25 may be located entirely in the space 83, but is preferably located with part thereof, shown at 24, in the heating space and the rest thereof, indicated at 25, looped in the air return duct 89.

This latter arrangement is advantageous, not only because it provides a convenient way of running the thermo-responsive element from the upstairs room to the basement, but the air in the return duct 89 is closely representative of the average temperature of the heated space.

The outside temperature reflecting portion 31 of the hot air installation is located outside the building, as in the Fig. 1 construction, and of course the length thereof exposed to the outside temperature and also the length 27 that is exposed to the heating medium, are proportioned as in the manner fully explained above.

The control apparatus 93 of Fig. 5 which is also shown in Fig. 7 and in detail in Fig. 6, is of a simplified form adapted for direct control of the damper 91 without the intervention of an electric switch or other electric control facilities.

This simplified form is the same as that of Fig. 2 insofar as the expansion member, the mounting thereof and the arrangement of the plunger operated by the expansion member is concerned and the same reference numerals are applied to these parts, except that the plunger 42 of Fig. 6 has a tapered upper end 94 providing a bearing edge for reasons hereinafter explained.

Instead of the electric switch 50 and inside rock arm 52 of the Fig. 2 control apparatus, this apparatus 93 is provided with a long lever 95 which is pivoted at one end as at 96 and has the other end projecting outwardly through an opening 97 in the side wall 98 of the enclosing case, and this lever at a location relatively near to the pivot 96 rests on the upper end of the plunger 42, as indicated at 99, so that the movement of the latter swings the lever 95 up and down on its pivot 96 and imparts greatly compounded movement to the outer end 100 of the lever. Preferably the lever 95 has a wide V-notch at the place 99 where the tapered upper end engages therewith to provide a fulcrum seat and this prevents the plunger 42 from turning.

Adjustability of the lever 95 as a whole is desirable to correspond to the adjustability of the lever and switch of Fig. 2, and for the same purpose, namely to regulate the level of room temperature to be maintained by the control apparatus, and for this purpose the lever 95 is pivoted at 96 to the arm 101 of a bell crank, indicated as a whole at 102, which is pivoted at its elbow to a bearing pin 103 which is secured to the back wall of the enclosing case, and this bell crank has an arm 104 depending from the elbow thereof and provided at its lower end with a cam embracing slot 105 in which is located an eccentric cam 106 which is fixed on a shaft or stem 107 journaled in a suitable bearing (not shown) on the rear wall of the apparatus case.

This stem 107 projects through the front wall of the apparatus case and has a knob 108 fixed on the exposed outer end and the front wall of said apparatus case, like that of the apparatus 20 of Fig. 1, has graduations corresponding to selectable room temperature levels and the knob 108 has a pointer to register with these graduations for setting the control apparatus at the selected temperature level.

The cam 106 is arranged so that at the midpoint of its permissible range of adjustment the pointer on the knob 108 registers with the normal room temperature level, usually 70° F., and the apparatus is preferably arranged so that the plunger 42 will hold the lever 95 in horizontal position at this setting.

The outer end 100 is connected, as for example by a chain 109, with the damper 91 with an appropriate length so that at the midpoint of the cam 106 the damper 91 will be located at the position generally required to maintain the selected normal temperature of 70° F. in the room 83.

The operation of the control 93 will of course regulate the position of the damper one way or the other according to the temperature controlled operation of the apparatus 93 and this causes the heater 86 to furnish the necessary hot air to properly heat the room.

This Fig. 5 and 7 arrangement is not a start and stop control, like the switch control of Figs. 1 and 2, but a progressively variable regulator which slows down and increases the rate of fuel combustion and may be used in any case of any variable fuel combustion heater, a typical example of which is the coal fired heater, or in any other device or system in which the heat unit source is of progressively variable nature.

This Fig. 6 control apparatus may, however, be employed for start and stop operation if desired, by connecting the arm 95 thereof to the operating element of an electrical switch, or of any other power supply mechanism or device, which may be interposed between the control apparatus 93 and the heat unit supply or extractor device and furnishes the power to start and stop the heating unit supply or extractor device that is to be stopped and started thereby.

In steam heating the heating medium supplied to the heat exchangers or radiators has a relatively constant temperature and is not indicative of the heat value, in temperature terms, of the heat supply. In such cases the heat value is determinable, for purposes of the present invention, by the temperature of the condensate return from the heating system, which reflects the temperature value of the utilized heat, or by the cross sectional or average temperature of a heat transfer device of the steam heating system, to either of which the portion of the thermo-responsive element 23 corresponding to the portion 27 of Fig. 1 may be applied.

Obviously with the bendable tube construction of the above described thermo-responsive element 23 and ample length for the purpose, any required length and ratios of lengths of the portions 27 and 31 may be readily and accurately provided to insure proper balance between the local temperature effect at the outside of the building and at the heating medium place, on the thermo-responsive element 23.

Other types of bendable and proportionable thermo-responsive elements may be employed and as an example thereof I have shown in Fig. 8 a form in which an element of electrically conductive wire is employed having a high temperature coefficient of resistance so that the conductivity thereof varies with the temperature to which it is subjected.

A doubled back length of such wire doubled back at 110 and having an outwardly extending length 111 and a return length 112, and having an appropriate doubled length is employed, for example 46 feet, as in the case of the above described element 23, from the bend 110 to the place of origin of the two lengths 111 and 112, or the wire may be doubled back and forth a number of times to provide sufficient total rate of resistance change that is required.

Preferably this wire is adapted for low voltage and the current is supplied thereto from a transformer 113 which supplies the desired low voltage from the conventional 120 volt 60 cycle A. C. supply.

The control element of this thermo-responsive element 111, 112, may be a winding 114 in which heat is generated in accordance with the amount of current flow through the element 111, 112 and which is connected at one end with the current supply line 115 from the transformer 113 and at the other end to the end of the outwardly extending length 111 remote from the doubled back place 110. The corresponding end of the other length 112 is connected to the transformer 113.

A bi-metal switch arm 116 is positioned close alongside the heater winding 114 so as to be subjected to the temperature thereof, and has a contact 117 at the free end which is biased to separate from a companion contact 118 but by the action of sufficient heat on the bi-metal of the arm 116 is caused to engage the contact 118, the arrangement being such that when the thermo-responsive element 111, 112 is installed in the manner and for a purpose of corresponding to that of the element 23 in Fig. 1 and Fig. 5, the total resistance thereof, when the temperature of the heated area is at the normal temperature level and no heat is required therefor, is such that sufficient current flows through the conductor lengths 111, 112 to the heater to maintain a temperature of the latter to maintain the contact 117 in engagement with the contact 118.

When, however, the total resistance of the thermo-responsive element 111, 112 is increased by heating of the part thereof corresponding to the section 27 of Fig. 1, or heat from any other source, and the total resistance of the combined lengths 111, 112 thereby increased, then the amount of current flow to the heater 114 will be insufficient to maintain the contact 117 in engagement with the contact 118.

Reversely, when the total over-all resistance of the lengths 111, 112 is diminished, the heater will cause the switch arm 116 to deflect and engage the contact 117 with the contact 118.

The bi-metal switch 116, 117, 118 is interposed in one of the conductors 119, 120 which are connected to the heater control, for example the control box 15 of Fig. 1, and thereby the resistance of thermo-responsive element 111, 112 exercises the same control as the liquid type thermo-responsive element 23 of Figs. 1 and 2.

From the foregoing it will be understood that the control of this invention responds faithfully to the various temperatures to which it is exposed and coordinates the effects thereof instantly, accurately and in proper proportion to the operation of the control, that the control is particularly simple and convenient and easily installed and readily and properly proportioned to the particular temperature conditions of the installation.

With the control the range of temperature of the heating medium may be varied without affecting the limits of temperatures external to the space to be heated, the limits of external temperature external to the space to be heated may be varied without changing the range of temperature of the heating medium; the temperature level of the space being heated or cooled is variable as the temperature external to the space varies, so as to compensate for loss of radiation from the human body to cold outer wall surfaces of the building in cold weather, the degree of changes of temperature of the space being heated or cooled per degree of change of temperature external of the space may be varied, the temperature of the heating or cooling medium may be varied as the temperature within the space being heated or cooled, and as the temperature external of the space being heated or cooled, changes, the degree of change of the temperature of the heating or cooling medium per degree of temperature change within and/or external of the space being heated or cooled may be varied, the degree or rate of change of the temperature of the heating medium is changed to maintain the same limits of temperature of the heating medium, when the range of temperature external of the space to be heated is changed, the control is readily adaptable and changeable to accord with the different limits of variable temperatures in various geographical areas and to accord with the different operating limits of the heating systems that are required in such areas, and the temperature level of the heating space may be manually varied and the same control of uniformity thereof maintained at any selected thus varied temperature level.

While I have shown and described my invention in preferred forms, I am aware that various changes and modifications may be made therein without departing from the principles of the invention, the scope of which is to be determined by the appended claims.

What is claimed is:

1. A temperature control device of the class described characterized in part by its applicability to heating systems of various types, including both hot-air and hot water systems regardless of how fired, and characterized further by being prefabricated as a complete operable unit adapted for application to a wide range of both new and existing heating installations to provide control for such heating systems in response to a composite of temperature conditions at a plurality of points, said device comprising a movable control element and a sensing element for operating said movable element, said sensing element comprising a continuous, readily bendable, closed tube containing a heat sensitive expansible fluid, said tube comprising three readily identifiable portions of different lengths connected in series, the first and longest portion being adjacent to the movable element for sensing inside room temperature and having a section thereof adapted to be placed in heat exchange relationship to a heat output section of the heating system, the second and shortest portion being adjacent to the closed end of the tube and adapted to be responsive to outside temperature, and the third portion being of intermediate length and positioned between said other two portion, said third portion having an internal diameter substantially smaller than the first and second portions thereby making it relatively insensitive to ambient temperatures, and indicia on the first portion of the tube adjacent to the intermediate or third portion thereof for indicating how much of the first portion of the tube is to be placed in heat exchange relation with the heat output section of the particular heating system to which the device is applied, and corresponding indicia on the second portion of the tube for indicating how much of this section of the tube is to be exposed to outside temperature conditions.

2. A temperature control device as set forth in claim 1 in which the ratio of lengths of said first, second, and third portions is of the order of 8 to 2⅓ to 5, respectively.

3. A temperature control device of the class described for regulating the supply to a room of a room temperature conditioning medium from a supply system thereof and characterized by adaptability of the control device to various types of such supply systems, including both liquid and gaseous medium supply systems, and characterized further by being prefabricated as a complete operable unit adapted for application to a wide range of both new and existing room temperature conditioning installations to provide control of such medium supply systems in response to a composite of temperature conditions at a plurality of points, said device comprising a movable control element and a sensing element for operating said movable element, said sensing element comprising a continuous, readily bendable, closed tube containing a heat sensitive expansible fluid, said tube comprising three readily identifiable portions of different lengths connected in series, the first and longest portion being adjacent to the movable element for sensing inside room temperature and having a section thereof adapted to be placed in heat exchange relationship to an output section of the temperature conditioning medium supply system, the second and shortest portion being adjacent to the closed end of the tube and adapted to be responsive to outside temperature, and the third portion being of intermediate length and positioned between said other two portions, said third portion having an internal diameter substantially smaller than the first and second portions thereby making it relatively insensitive to ambient temperatures, and indicia on the first portion of the tube adjacent to the third portion thereof for indicating how much of the first portion of the tube is to be placed in heat exchange relation with the output section of the temperature conditioning medium supply system to which the device is applied, and corresponding indicia on the second portion of the tube for indicating how much of this section of the tube is to be exposed to outside temperature conditions.

References Cited in the file of this patent

UNITED STATES PATENTS

| | | |
|---|---|---|
| 1,331,553 | Amthor | Feb. 24, 1920 |
| 1,971,532 | McAuley | Aug. 28, 1934 |
| 2,044,822 | Vaughn | June 23, 1936 |
| 2,136,559 | Miller | Nov. 15, 1938 |
| 2,164,882 | Miles | July 4, 1939 |
| 2,490,919 | Raney | Dec. 13, 1949 |